(12) United States Patent  
Dandrow et al.

(10) Patent No.: US 12,306,332 B2  
(45) Date of Patent: May 20, 2025

(54) RADAR DETECTOR UTILIZING COMPLEX DATA FOR PROCESSING OF SIGNAL INFORMATION

(71) Applicant: NoLimits Enterprises, Inc., Cincinnati, OH (US)

(72) Inventors: Jonathan Dandrow, Cincinnati, OH (US); Robert Carson Taylor, Hamilton, OH (US)

(73) Assignee: NoLimits Enterprises, Inc., Cincinnati, OH (US)

( * ) Notice: Subject to any disclaimer, the term of this patent is extended or adjusted under 35 U.S.C. 154(b) by 270 days.

(21) Appl. No.: 17/774,375

(22) PCT Filed: Nov. 3, 2020

(86) PCT No.: PCT/US2020/058684  
§ 371 (c)(1),  
(2) Date: May 4, 2022

(87) PCT Pub. No.: WO2021/091882  
PCT Pub. Date: May 14, 2021

(65) Prior Publication Data  
US 2022/0365172 A1 Nov. 17, 2022

Related U.S. Application Data

(60) Provisional application No. 62/930,110, filed on Nov. 4, 2019.

(51) Int. Cl.  
*G01S 7/35* (2006.01)  
*G01S 13/86* (2006.01)

(52) U.S. Cl.  
CPC .............. *G01S 7/354* (2013.01); *G01S 13/86* (2013.01)

(58) Field of Classification Search  
CPC .......... G01S 7/354; G01S 13/86; G01S 7/022; G06N 3/02  
See application file for complete search history.

(56) References Cited

U.S. PATENT DOCUMENTS 5,146,226 A     9/1992   Valentine et al.  
6,175,324 B1 *   1/2001   Valentine ................ G01S 7/022  
                                                           455/313

(Continued)

FOREIGN PATENT DOCUMENTS

CN            108549832 A   *   9/2018            G01S 13/02

OTHER PUBLICATIONS

Krogmeier, J.V., "Complex Baseband Models for Passband Communication Systems,", Published on Nov. 21, 2014.

*Primary Examiner* — Bernarr E Gregory  
*Assistant Examiner* — Juliana Cross  
(74) *Attorney, Agent, or Firm* — Wood Herron & Evans LLP

(57) ABSTRACT

The use of complex analysis enables enable various new methods and strategies for the identification of a RF transmission source in a radar detector. The incoming signal (13) is processed using complex signal representations (I, Q), allowing for the recognition of signal patterns in the radio spectrum which may be hidden by conventional methods using only demodulation of signals which are in-phase with a local oscillator. The additional signal information can aid in overcoming signal and noise discrimination challenges faced by radar detectors using traditional band-limited, scalar sampling strategies, including the challenge of discriminating between police radar signals and other radar sources that utilize signals in the same frequency ranges (Continued)

(e.g., radar door openers, traffic sensors, vehicle-based collision avoidance, cruise control, blind spot monitor emitters).

36 Claims, 4 Drawing Sheets

(56) References Cited

U.S. PATENT DOCUMENTS

| | | | |
|---|---|---|---|
| 6,366,236 B1* | 4/2002 | Farmer | G01S 7/417 |
| | | | 342/195 |
| 2017/0207526 A1* | 7/2017 | Govoni | H01Q 5/307 |

* cited by examiner

RADAR DETECTOR UTILIZING COMPLEX DATA FOR PROCESSING OF SIGNAL INFORMATION

This application is a U.S. National Application of PCT Application US2020/058684 filed Nov. 3, 2020, which claims the benefit of U.S. Provisional Application 62/930,110 filed on Nov. 4, 2019. The entire contents of these applications are incorporated herein by reference in their entirety.

BACKGROUND OF THE INVENTION

The present invention relates to the sampling of radio frequency (RF) signals using complex signal representations.

Traditionally, radar detectors have relied on conventional conversion and sampling methods to collect signal information for use in the detection of police radar signals. These sampling methods include processing radio frequency information from an antenna via frequency shifting, filtering, and other signal processing, after which the waveform is sampled by an analog-to-digital (ADC) converter. Typically, the ADC samples the processed waveform as a time series of scalar amplitudes which represent radar frequency band information to be evaluated for detection.

SUMMARY OF THE INVENTION

The present invention employs complex sampling of a frequency shifted and processed incoming signal, to enable various new methods and strategies for the identification of a RF transmission source upon collecting and analyzing the transmission signal. The complex signal representations produced by the inventive approach allow for the recognition of signal patterns in the radio spectrum which may be hidden by conventional methods using only demodulation of signals which are in-phase with a local oscillator. The additional signal information can aid in overcoming signal and noise discrimination challenges faced by radar detectors using traditional band-limited, scalar sampling strategies. These challenges include the ability to discriminate between police radar signals and other sources that utilize signals in the same frequency ranges (e.g., radar door openers, traffic sensors, vehicle-based collision avoidance, cruise control, blind spot monitor emitters).

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

In the following detailed description of several illustrative embodiments, reference is made to the accompanying drawings that form a part hereof, and in which is shown by way of illustration specific preferred embodiment in which the invention may be practiced. These embodiments are described in sufficient detail to enable those skilled in the art to practice the invention, and it is understood that other embodiments may be utilized, and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Figure 1:
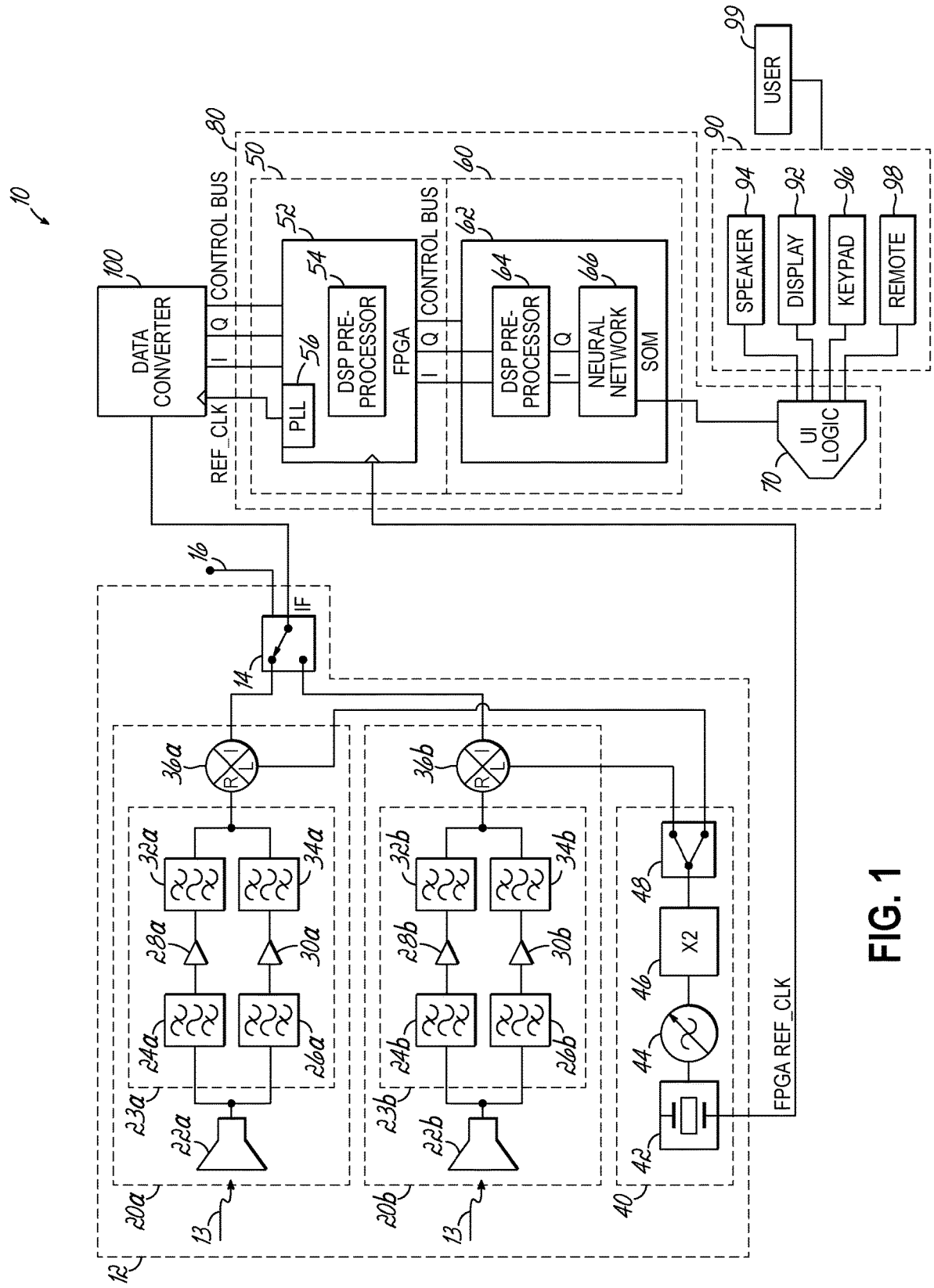
FIG. 1 is a schematic view of a radar detector utilizing complex data.

FIG. 1 is a schematic view of a radar detector capturing complex incoming signal data. The detector 10 generally comprises a receiver section 12, a data converter 100, a control system 80, and a user interface 90. Controls between and within the data converter 100 and the control system 80 may be realized through the implementation of a control bus. The control bus may originate from a control master that is a part of the control system 80 itself, or a separate system on a chip (SoC). In the current embodiment, the receiver section 12 is further comprised of a front horn receiver 20a, rear horn receiver 20b, a local oscillator (LO) section 40, and an IF switch 14. Additionally, the control system 80 contains a complex programmable logic device (CPLD) subsystem 50, a system on module (SoM) carrier 60, and the user interface logic 70 in the current embodiment.

The receiver section 12 may receive radar signals 13 via one or several horn receivers such as the front horn receiver 20a and the rear horn receiver 20b. Although two horn receivers are presented in the current embodiment, it will be appreciated that other embodiments may include more than two horn receivers. Alternatively, other embodiments may substitute an impedance-matched signal source in place of a horn receiver.

In the current embodiment, the horn receivers 20a, 20b differ only in the orientation of their horn antennae 22a, 22b. For each horn receiver 20a, 20b, the horn antenna 22a, 22b receives the radar signal 13 and feeds the signal into a diplexer network 23a, 23b. As shown in FIG. 1, the signal is split into two signals—an x-band signal and a k+$k_a$-band signal—using an x-band filter 24a, 24b and a k+$k_a$-band filter 26a, 26b, amplified with an x-band low-noise amplifiers (LNA) 28a, 28b and a k+$k_a$-band LNA 30a, 30b, summed into one signal with an x-band bandpass 32a, 32b and a k+$k_a$-bandpass 34a, 34b, and fed into a downconversion mixer 36a, 36b.

The downconversion mixer 36a, 36b is also fed by a local oscillator (LO) section 40. The LO section 40 may include a reference oscillator 42 that drives a synthesizer 44—exemplary embodiments utilize 40 Mhz as the frequency for the reference oscillator 42. In addition, the reference oscillator 42 may be utilized in other areas the detector 10, such as with the field programmable gate array (FPGA) 52. Continuing with the illustrated embodiment of the LO section 40, the synthesizer 44 subsequently feeds a frequency doubler and filter 46, which doubles the frequency and extracts the second harmonic of the frequency. The distribution coupler 48 then receives the second harmonic and sends it to each downconversion mixer 36a, 36b.

For each downconversion mixer 36a, 36b, the summed signal stemming from the horn receiver 20a, 20b and the second harmonic signal from the LO section 40 are mixed to produce an intermediate frequency (IF). Each IF is then fed into an IF switch 14, wherein an antenna selecting signal on control line 16 is used to select an IF to serve as an output from the receiver section 12.

The selected IF is subsequently fed into a data converter 100. The data converter 100 serves to render complex digital signal samples I and Q based on the selected IF. Alternatively stated, each sample of the selected IF is digitized and comprised of two data points, one in-phase (I), and one in quadrature (Q) which is sampled 90° out of phase. By doing so the complex sample representations can represent signal phase in addition to signal magnitude. The signal phase information carried in these samples allow the signal of interest to be analyzed in both the positive and negative frequency domains extending from 0 Hz to $+/-F_s/2$, where $F_s$ is the frequency at which the signal has been sampled. This method effectively doubles the Nyquist-limited bandwidth at which analysis can be conducted without the effects of aliasing. Additionally, samples containing phase information can be used to determine the complex argument of each point in the sample time series, allowing algorithms to extract information about the phase modulation components contained in a received signal of interest.

Figure 2:
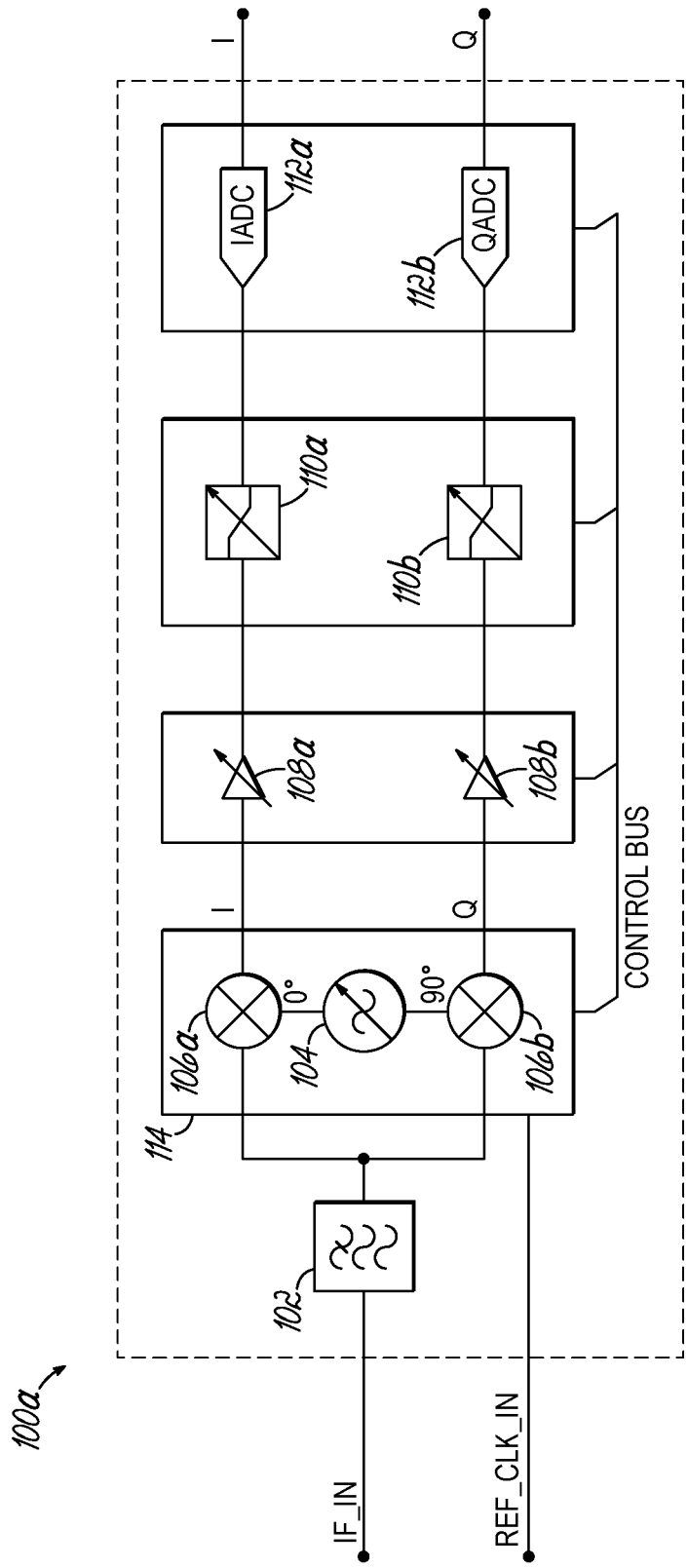
FIG. 2 shows a schematic view of complex data derivation using quadrature intermediate frequency sampling.
Figure 3:
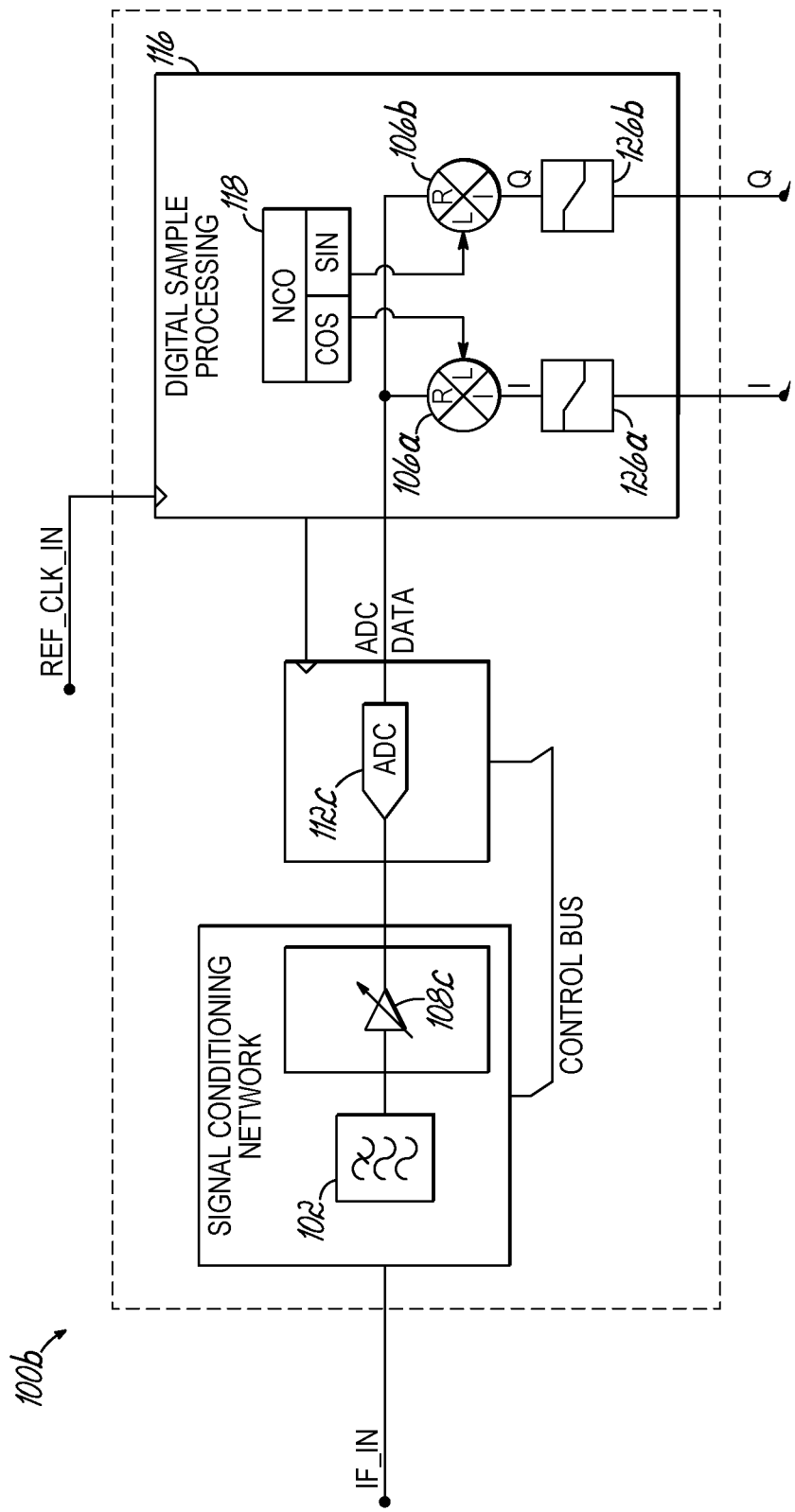
FIG. 3 illustrates a schematic view of complex data derivation using complex digital mixing.
Figure 4:
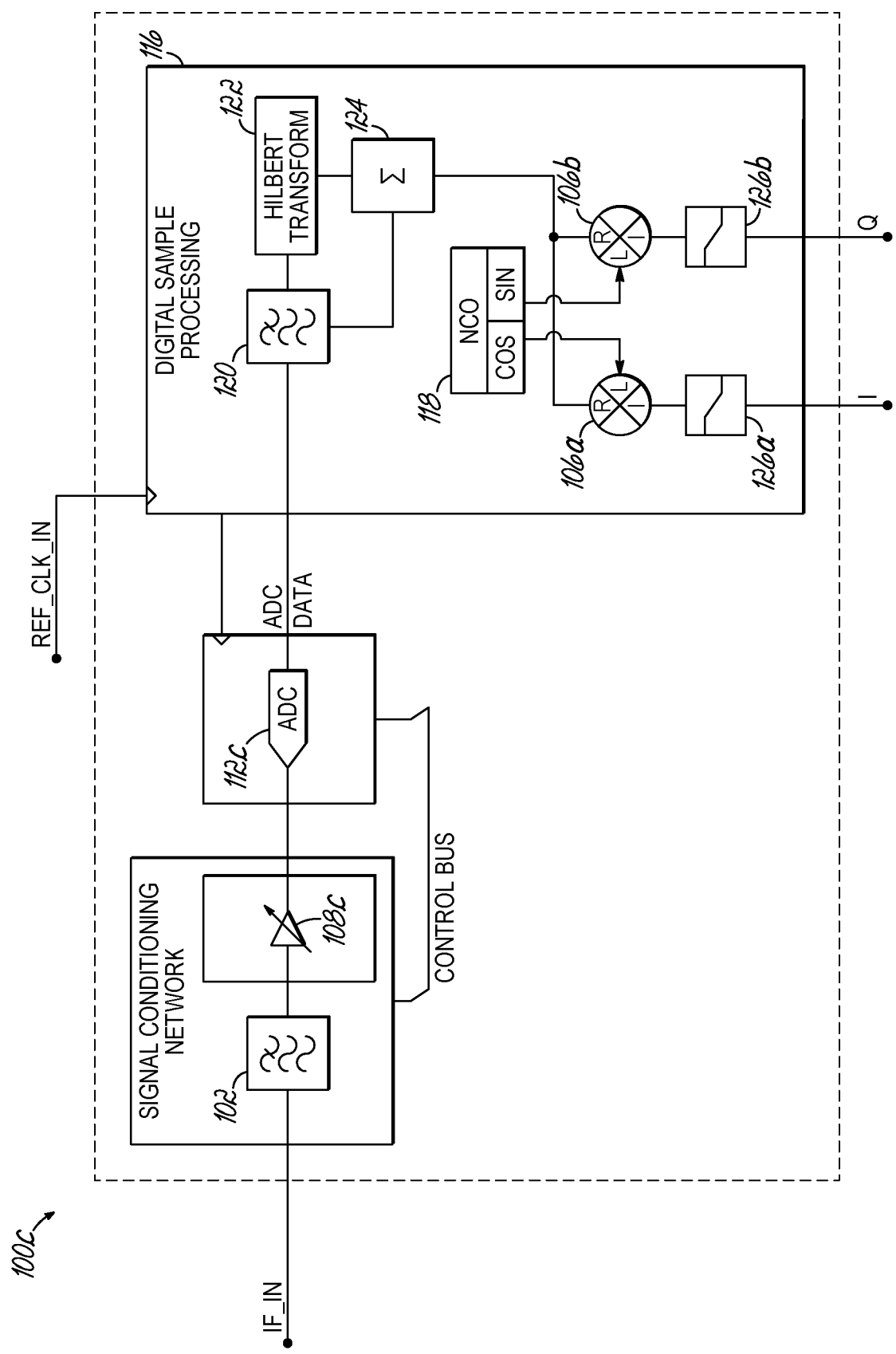
FIG. 4 depicts a schematic view of complex data derivation using Hilbert transformation.

In alternative embodiments, different configurations of the data converter may exist to render the complex digital signal samples. Examples include quadrature intermediate frequency sampling, complex digital mixing, and complex data derivation using Hilbert transformation. FIGS. 2-4, described below, illustrate these examples.

Subsequent to the data converter, the sample streams representing the complex digital signals I and Q may be processed in turn by a complex programmable logic device (CPLD) subsystem 50 and a system on module (SoM) carrier 60.

In an embodiment of the invention, the CPLD subsystem 50 hosts a field programmable gate array (FPGA) 52 that is configured with a digital signal processing (DSP) preprocessor 54 and a phase locked loop (PLL) 56. Operatively, the FPGA 52 synchronizes with the reference oscillator 42 and subsequently outputs a synchronized reference clock via the PLL 56 to the data converter 100. The FPGA preprocessor 54 is configured to apply Cascaded Integrator-Comb and Fast Fourier Transform (FFT) algorithms to the complex digital signal samples to produce a frequency domain transformed representation of the complex digital signal. Once preprocessing on the FPGA 52 is complete, the complex digital signal samples I and Q are fed into the SoM 62.

Importantly, the SoM 62 allows for complex signal analysis to be achieved. The SoM 62 may be of a small outline dual in-line memory module (SO-DIMM) type and hosted on the SoM carrier 60. In preparation for complex signal analysis, the complex digital signal samples I and Q are processed through a DSP preprocessor, SoM preprocessor 64. The SoM preprocessor 64 decimates the incoming signal to a sequence of spectral content snapshots for pattern recognition. Subsequently, the complex signal analysis of the complex digital signal samples I and Q is performed using the neural network 66.

The neural network 66 implements machine learning/artificial intelligence principles to perform complex signal analysis on the complex digital signal samples I and Q. The neural network 66 responds to this content and its internal neural pathways to discriminate between incoming radar signals from non-police sources and those from police sources. Embodiments of the invention may include a neural network with layered architecture, where the layers can include, but are not limited to, the following: convolution (1D, 2D, or n dimensional), fully connected, relu, max pooling, average pooling, and long-short-term memory (i.e., recurrent neural networks). Detailed discussion of the use of neural networks for signal discrimination in this manner is provided in co-pending provisional application Ser. No. 62/855,111 which is incorporated by reference herein in its entirety.

The response of neural network 66 is delivered to a user interface logic 70 which assesses the response and determines whether to initiate an alert, such as a warning that radar determined likely to be from police sources has been identified. Alerts are delivered to a user 99 via the user interface 90 which is connected to and responsive to the user interface logic 70. The user interface 90 includes a display 92 for presenting information about the operation of the radar detector, including details about alerts which are identified by the neural network 66, which are typically—but not necessarily—accompanied with a display readout and/or a speaker tone, chip or spoken voice via a speaker 94. The user interface 90 further includes a keypad 96 for receiving commands from the user 99 (e.g., adjusting radar detector settings, acknowledging/muting alerts, optionally providing feedback on the nature of signals which have triggered an alert). The keypad 96 may take the form of a series of keys or buttons on the housing of the radar detector. Alternative embodiments may include additional keys or buttons on a remote device 98 which may be positioned in locations such as within the passenger cabin or on the power detector cord.

FIG. 2 shows a schematic view of complex data derivation using quadrature intermediate frequency sampling for the data converter 100, namely quadrature-based converter 100a. This method of sampling enables a real band-pass signal at the selected intermediate frequency (IF)—such as 915 MHz, for example—of the receiver section 12 to be rendered into quadrature samples. The selected IF from the receiver section 12 is first processed through an anti-aliasing filter 102. In one embodiment anti-aliasing filter 102 removes incoming signal components at frequencies above the Nyquist frequency (half the sampling rate) applicable to the ADC utilized by the data converter. In other embodiments this requirement is relaxed, as discussed below. The filtered IF is then fed to an IF demodulator 114, which is comprised of mixers 106a, 106b and the quadrature LO 104. The quadrature LO 104 generates two signals that are 90° out of phase at the same frequency as the filtered IF and is integrally connected to each mixer 106a, 106b. The mixer 106a is fed the in-phase baseband (i.e., 0°, cosine) and the mixer 106b is fed the quadrature baseband (i.e., 90°, sine) from the quadrature LO 104. As a result, a complex signal emerges—the I and Q baseband signal (i.e., a baseband version of the IF, centered at 0 Hz)—with the I complex signal component serving as the output of the mixer 106a and the Q complex signal component serving as the output of the mixer 106b.

Each complex signal component, I and Q, is fed into a respective buffer/driver 108a, 108b. Some embodiments of the invention may include the buffer/driver 108a, 108b being of fixed or programmable gain. The complex signal components are then passed through respective input filters 110a, 110b before being sampled by ADCs. The input filter 110a, 110b may also be of either a programmable or fixed nature, and may reduce signal components above the Nyquist frequency for the following quadrature ADCs, or this requirement may be relaxed, as discussed below. Each quadrature ADC 112a, 112b then samples a complex signal component, resulting in a complex digital signal sample that can be fed into the CPLD subsystem 50.

As noted above, initial filtering may pass though spectral components above the Nyquist frequency of the sampling ADC of the data converter. Normally the resulting aliasing would be destructive to signal processing and recognition, but in the context of the present invention downstream signal processing ultimately uses pattern recognition and neural network processing, and in that context aliasing of the originally received signal may not be harmful to pattern recognition, and indeed may be helpful in that it can produce a more unique signal pattern using higher spectral components of the incoming signal, aiding later discrimination and recognition of signal sources.

FIG. 3 illustrates a schematic view of complex data derivation using complex digital mixing for the data converter 100, namely complex digital mixing-based converter 100b. In this embodiment, also known as digital down conversion (DDC), complex vector generation operates on a down-converted selected IF signal. Embodiments may include, as depicted in FIG. 3, a selected IF signal that exists as a single signal, or as a pair of in-phase 90° shifted signals. Initially, the selected IF passes through a signal conditioning network that sets the signal characteristics that are optimal for ADC sampling. In one embodiment this includes an initial filtering through an anti-aliasing filter 102, such that no spectral components exist outside of the Nyquist zone of the single channel ADC 112c. In other embodiments, the initial filtering may permit spectral components above the Nyquist frequency (half the sampling rate) of the sampling ADC, as discussed below. Following the anti-aliasing filter 102, the signal conditioning continues through buffer/driver 108c, presently embodied as a programmable gain buffer/driver but alternatively embodied as a fixed gain buffer/driver. The conditioned signal is subsequently sampled by a single channel ADC 112c, embodiments of which may include a high-speed ADC.

As noted above, initial filtering may permit spectral components above the Nyquist frequency of the sampling ADC 112c. Normally the resulting aliasing would be destructive to signal processing and recognition, but in the context of the present invention downstream signal processing ultimately uses pattern recognition and neural network processing, and in that context aliasing of the originally received signal may not be harmful to pattern recognition, and indeed may be helpful in that it can produce a more unique signal pattern using higher spectral components of the incoming signal, aiding later discrimination and recognition of signal sources.

After conditioning, the digitized signal is fed into a digital sample processing device 116 for further down conversion and processing. The digital sample processing device 116 further includes a Numerically-Controlled Oscillator/Direct Digital Synthesizer (NCO/DDS), namely digital synthesizer 118, which serves to output a variable-frequency digital waveform with cosine (0°) and sine (90°) outputs. The mixer 106a is fed the in-phase baseband (i.e., 0°, cosine) and the mixer 106b is fed the quadrature baseband (i.e., 90°, sine) as input. For each mixer 106a, 106b, the digitized signal is also provided as an input. The input pairs for each mixer 106a, 106b are then multiplied at the mixer, with the output filtered using digital baseband filter 126a, 126b. As a result, a complex sample vector is produced, which may also be referred to as the I and Q digital data sets.

If the digital synthesizer 118 is programmed at the frequency at which a signal exists in the selected IF signal, the I and Q digital data sets may be centered at 0 Hz and can be referred to as a base-band vector series. This configuration allows for processing to take place at a reduced rate where the sample rate extends to +/−BW/2, where BW is the occupied bandwidth in hertz of the digitized signal of interest.

In an alternative embodiment where the selected IF signal is demodulated into a pair of in-phase 90° shifted signals, the signal pair is each multiplied by a digital synthesizer 118 NCO output of the same phase.

FIG. 4 depicts a schematic view of complex data derivation using Hilbert transformation for the data converter 100, namely Hilbert transform-based converter 100c. The initial portion of this embodiment operates similar to the DDC embodiment depicted in FIG. 3. Initially, the selected IF passes through a signal conditioning network that sets the signal characteristics that are optimal for ADC sampling. This includes an initial filtering through an anti-aliasing filter 102, such that no spectral components exist outside of the Nyquist zone of the single channel ADC 112c, or a controlled extent of spectral components above the Nyquist frequency of the ADC 112c are permitted, as discussed above. Following the anti-aliasing filter 102, the signal conditioning continues through buffer/driver 108c, presently embodied as a programmable gain buffer/driver but alternatively embodied as a fixed gain buffer/driver. The conditioned signal is subsequently sampled by a single channel ADC 112c, embodiments of which may include a high-speed ADC.

After conditioning, the digitized signal is fed into a digital sample processing device 116 and applied to a digital filter 120 producing a band-limited signal for the Hilbert transform-based converter 100c. For this process, the digitized signal may also be interpreted as a scalar sample series representing the signal of interest, s(t). The Hilbert transform module 122 receives s(t) and applies the Hilbert transform—which works by virtue of convolutions (t) with the function $1/(\pi t)$—to s(t), resulting in an output signal, ŝ(t), that has a 90° phase shift applied to every Fourier component of s(t). The resulting signal ŝ(t) is the analytic expression of s(t). Both s(t) and ŝ(t) are fed into the summation module 124. The resulting summation of s(t) and ŝ(t) at the summation module 124 yields the complex-value function $s_a(t)$, which remains a pass-band signal quantity that occupies only the upper half-plane of the processing bandwidth.

The digital sample processing device 116 further includes a Numerically-Controlled Oscillator/Direct Digital Synthesizer (NCO/DDS), namely digital synthesizer 118, which produces a variable-frequency digital waveform with cosine (0°) and sine (90°) outputs. Mixer 106a is fed the in-phase baseband (i.e., 0°, cosine) and mixer 106b is fed the quadrature baseband (i.e., 90°, sine) as input. For each mixer 106a, 106b, the complex-value function $s_a(t)$ is also provided as an input. The inputs of each mixer 106a, 106b are multiplied at the mixer, with the output filtered using digital baseband filter 126a, 126b. As a result, a complex sample vector emerges, which may also be referred to as the I and Q digital data sets.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A radar detector, comprising:
   a receiver section for receiving one or more radar signals, the receiver section providing a received RF signal in an intermediate frequency band, the received RF signal comprising at least one of the one or more radar signals;
   a data converter for receiving the received RF signal, the data converter creating a digitized complex signal from the received RF signal, the digitized complex signal comprising a plurality of digital signal samples, each of the plurality of digital signal samples comprised of at least an in-phase component and an out-of-phase component that is 90° out-of-phase with the in-phase component, the data converter creating the digitized complex signal by:
      generating a first local oscillator signal and a second local oscillator signal that is 90° out of phase with the first local oscillator signal, wherein the first local oscillator signal and the second local oscillator signal are within the intermediate frequency band;
      mixing the first local oscillator signal with the received RF signal to produce an in-phase signal;
      mixing the second local oscillator signal with the received RF signal to produce an out-of-phase signal;
      sampling the in-phase signal to create the in-phase component; and
      sampling the out-of-phase signal to create the out-of-phase component; and
   a control system for receiving the digitized complex signal, the control system comprising a neural network trained to distinguish radar signal sources based upon characteristics of the digitized complex signal.

2. The radar detector of claim 1, wherein the receiver section comprises a first and a second horn receiver, each horn receiver having a primary reception axis along which the horn receives radar signals.

3. The radar detector of claim 2, wherein the radar detector includes a housing and the first and second horn receivers are mounted in the housing such that the primary reception axis of the first horn receiver is differently directed than the primary reception axis of the second horn receiver.

4. The radar detector of claim 1, wherein frequency components of the received RF signal in the intermediate frequency band exist above and below the frequency of the first local oscillator signal and the frequency of the second local oscillator signal.

5. The radar detector of claim 4, wherein frequency components of the output signal in the intermediate frequency band exist above and below the frequency of the first local oscillator signal and the frequency of the second local oscillator signal.

6. The radar detector of claim 1, wherein the control system
   further comprises:
      a first preprocessor for producing a frequency domain representation of the digitized complex signal; and
      a second preprocessor for producing a plurality of spectral content snapshots based on the frequency domain representation of the digitized complex signal, wherein the neural network analyzes the plurality of spectral content snapshots to determine a digitized complex signal classification.

7. The radar detector of claim 6, wherein digitized complex signal classification identifies the received RF signal as either from a police source, a non-police source or an unknown source.

8. The radar detector of claim 1, further comprising a user interface comprising one or more of:
   a speaker;
   a display;
   a keypad; and
   a remote.

9. The radar detector of claim 1 wherein the data converter samples the received RF signal at a sampling rate, wherein frequency components of the received RF signal in the intermediate frequency band exist above a frequency which is one-half of the sampling rate.

10. A radar detector, comprising:
    a receiver section for receiving one or more radar signals, the receiver section providing a received RF signal in an intermediate frequency band, the received RF signal comprising at least one of the one or more radar signals;
    a data converter for receiving the received RF signal, the data converter creating a digitized complex signal from the received RF signal, the digitized complex signal comprising a plurality of digital signal samples, each of the plurality of digital signal samples comprised of at least an in-phase component and an out-of-phase component that is 90° out-of-phase with the in-phase component, the data converter creating the digitized complex signal by:
       sampling the received RF signal to create a digital signal;
       generating a first local oscillator signal and a second local oscillator signal that is 90° out of phase with the first local oscillator signal;
       mixing the first local oscillator signal with the digital signal to produce the in-phase component; and
       mixing the second local oscillator signal with the digital signal to produce the out-of-phase component; and
    a control system for receiving the digitized complex signal, the control system comprising a neural network trained to distinguish radar signal sources based upon characteristics of the digitized complex signal.

11. The radar detector of claim 10, wherein the receiver section comprises a first and a second horn receiver, each horn receiver having a primary reception axis along which the horn receives radar signals.

12. The radar detector of claim 11, wherein the radar detector includes a housing and the first and second horn receivers are mounted in the housing such that the primary reception axis of the first horn receiver is differently directed than the primary reception axis of the second horn receiver.

13. The radar detector of claim 10, wherein frequency components of the received RF signal in the intermediate frequency band exist above and below the frequency of the first local oscillator signal and the frequency of the second local oscillator signal.

14. The radar detector of claim 13, wherein frequency components of the output signal in the intermediate frequency band exist above and below the frequency of the first local oscillator signal and the frequency of the second local oscillator signal.

15. The radar detector of claim 10, wherein the control system further comprises:
    a first preprocessor for producing a frequency domain representation of the digitized complex signal; and
    a second preprocessor for producing a plurality of spectral content snapshots based on the frequency domain representation of the digitized complex signal, wherein the neural network analyzes the plurality of spectral content snapshots to determine a digitized complex signal classification.

16. The radar detector of claim 15, digitized complex signal classification identifies the received RF signal as either from a police source, a non-police source or an unknown source.

17. The radar detector of claim 10, further comprising a user interface comprising one or more of:
   a speaker;
   a display;
   a keypad; and
   a remote.

18. The radar detector of claim 10 wherein the data converter samples the received RF signal at a sampling rate, wherein frequency components of the received RF signal in the intermediate frequency band exist above a frequency which is one-half of the sampling rate.

19. A radar detector, comprising:
   a receiver section for receiving one or more radar signals, the receiver section providing a received RF signal in an intermediate frequency band, the received RF signal comprising at least one of the one or more radar signals;
   a data converter for receiving the received RF signal, the data converter creating a digitized complex signal from the received RF signal, the digitized complex signal comprising a plurality of digital signal samples, each of the plurality of digital signal samples comprised of at least an in-phase component and an out-of-phase component that is 90° out-of-phase with the in-phase component, the data converter creating the digitized complex signal by:
      sampling the received RF signal to create a first digital signal;
      applying a Hilbert transform to the first digital signal to generate a second digital signal;
      summing the first digital signal with the second digital signal to generate a third digital signal;
      generating a first local oscillator signal and a second local oscillator signal that is 90° out of phase with the first local oscillator signal;
      mixing the first local oscillator signal with the third digital signal to produce the in-phase component; and
      mixing the second local oscillator signal with the third digital signal to produce the out-of-phase component; and
   a control system for receiving the digitized complex signal, the control system comprising a neural network trained to distinguish radar signal sources based upon characteristics of the digitized complex signal.

20. The radar detector of claim 19, wherein the receiver section comprises a first and a second horn receiver, each horn receiver having a primary reception axis along which the horn receives radar signals.

21. The radar detector of claim 20, wherein the radar detector includes a housing and the first and second horn receivers are mounted in the housing such that the primary reception axis of the first horn receiver is differently directed than the primary reception axis of the second horn receiver.

22. The radar detector of claim 19, wherein frequency components of the received RF signal in the intermediate frequency band exist above and below the frequency of the first local oscillator signal and the frequency of the second local oscillator signal.

23. The radar detector of claim 22, wherein frequency components of the output signal in the intermediate frequency band exist above and below the frequency of the first local oscillator signal and the frequency of the second local oscillator signal.

24. The radar detector of claim 19, wherein the control system further comprises:
   a first preprocessor for producing a frequency domain representation of the digitized complex signal; and
   a second preprocessor for producing a plurality of spectral content snapshots based on the frequency domain representation of the digitized complex signal, wherein the neural network analyzes the plurality of spectral content snapshots to determine a digitized complex signal classification.

25. The radar detector of claim 24, wherein the digitized complex signal classification identifies the received RF signal as either from a police source, a non-police source or an unknown source.

26. The radar detector of claim 19, further comprising a user interface comprising one or more of:
   a speaker;
   a display;
   a keypad; and
   a remote.

27. The radar detector of claim 19 wherein the data converter samples the received RF signal at a sampling rate, wherein frequency components of the received RF signal in the intermediate frequency band exist above a frequency which is one-half of the sampling rate.

28. A method of detecting a radar signal, comprising:
   receiving one or more radar band RF signals;
   processing the radar band RF signals to produce a received RF signal in an intermediate frequency band comprising at least one of the one or more radar signals;
   creating a digitized complex signal from the received RF signal, the digitized complex signal comprising a plurality of digital signal samples, and wherein each of the plurality of digital signal samples is comprised of at least an in-phase component and an out-of-phase component that is 90° out-of-phase with the in-phase component, by:
      generating a first local oscillator signal and a second local oscillator signal that is 90° out of phase with the first signal, wherein the first local oscillator signal and the second local oscillator signal are within the intermediate frequency band;
      mixing the first local oscillator signal with the received RF signal to produce an in-phase signal;
      mixing the second local oscillator signal with the received RF signal to produce an out-of-phase signal;
   sampling the in-phase signal to create the in-phase component; and
   sampling the out-of-phase signal to create the out-of-phase component;
   producing a frequency domain transformed representation of the digitized complex signal;
   producing a plurality of spectral content snapshots based on the frequency domain transformed representation of the digitized complex signal; and
   analyzing the plurality of spectral content snapshots in a neural network to determine a classification of at least one of the one or more radar signals.

29. The method of claim 28, wherein the classification identifies the received RF signal as either from a police source, a non-police source or an unknown source.

30. The radar detector of claim 28 wherein the digitized complex signal is created by sampling the received RF signal at a sampling rate, wherein frequency components of the received RF signal in the intermediate frequency band exist above a frequency which is one-half of the sampling rate.

31. A method of detecting a radar signal, comprising:
receiving one or more radar band RF signals;
processing the radar band RF signals to produce a received RF signal in an intermediate frequency band comprising at least one of the one or more radar signals;
creating a digitized complex signal from the received RF signal, the digitized complex signal comprising a plurality of digital signal samples, and wherein each of the plurality of digital signal samples is comprised of at least an in-phase component and an out-of-phase component that is 90° out-of-phase with the in-phase component, by:
sampling the received RF signal to create a digital signal;
generating a first local oscillator signal and a second local oscillator signal that is 90° out of phase with the first local oscillator signal;
mixing the first local oscillator signal with the digital signal to produce the in-phase component; and
mixing the second local oscillator signal with the digital signal to produce the out-of-phase component;
producing a frequency domain transformed representation of the digitized complex signal;
producing a plurality of spectral content snapshots based on the frequency domain transformed representation of the digitized complex signal; and
analyzing the plurality of spectral content snapshots in a neural network to determine a classification of at least one of the one or more radar signals.

32. The method of claim 31, wherein the classification identifies the received RF signal as either from a police source, a non-police source or an unknown source.

33. The radar detector of claim 31 wherein the digitized complex signal is created by sampling the received RF signal at a sampling rate, wherein frequency components of the received RF signal in the intermediate frequency band exist above a frequency which is one-half of the sampling rate.

34. A method of detecting a radar signal, comprising:
receiving one or more radar band RF signals;
processing the radar band RF signals to produce a received RF signal in an intermediate frequency band comprising at least one of the one or more radar signals;
creating a digitized complex signal from the received RF signal, the digitized complex signal comprising a plurality of digital signal samples, and wherein each of the plurality of digital signal samples is comprised of at least an in-phase component and an out-of-phase component that is 90° out-of-phase with the in-phase component, by:
sampling the received RF signal to create a first digital signal;
applying a Hilbert transform to the first digital signal to generate a second digital signal;
summing the first digital signal with the second digital signal to generate a third digital signal;
generating a first local oscillator signal and a second local oscillator signal that is 90° out of phase with the first local oscillator signal;
mixing the first local oscillator signal with the third digital signal to produce the in-phase component; and
mixing the second local oscillator signal with the third digital signal to produce the out-of-phase component;
producing a frequency domain transformed representation of the digitized complex signal;
producing a plurality of spectral content snapshots based on the frequency domain transformed representation of the digitized complex signal; and
analyzing the plurality of spectral content snapshots in a neural network to determine a classification of at least one of the one or more radar signals.

35. The method of claim 34, wherein the classification identifies the received RF signal as either from a police source, a non-police source or an unknown source.

36. The radar detector of claim 34 wherein the digitized complex signal is created by sampling the received RF signal at a sampling rate, wherein frequency components of the received RF signal in the intermediate frequency band exist above a frequency which is one-half of the sampling rate.

* * * * *